UNITED STATES PATENT OFFICE.

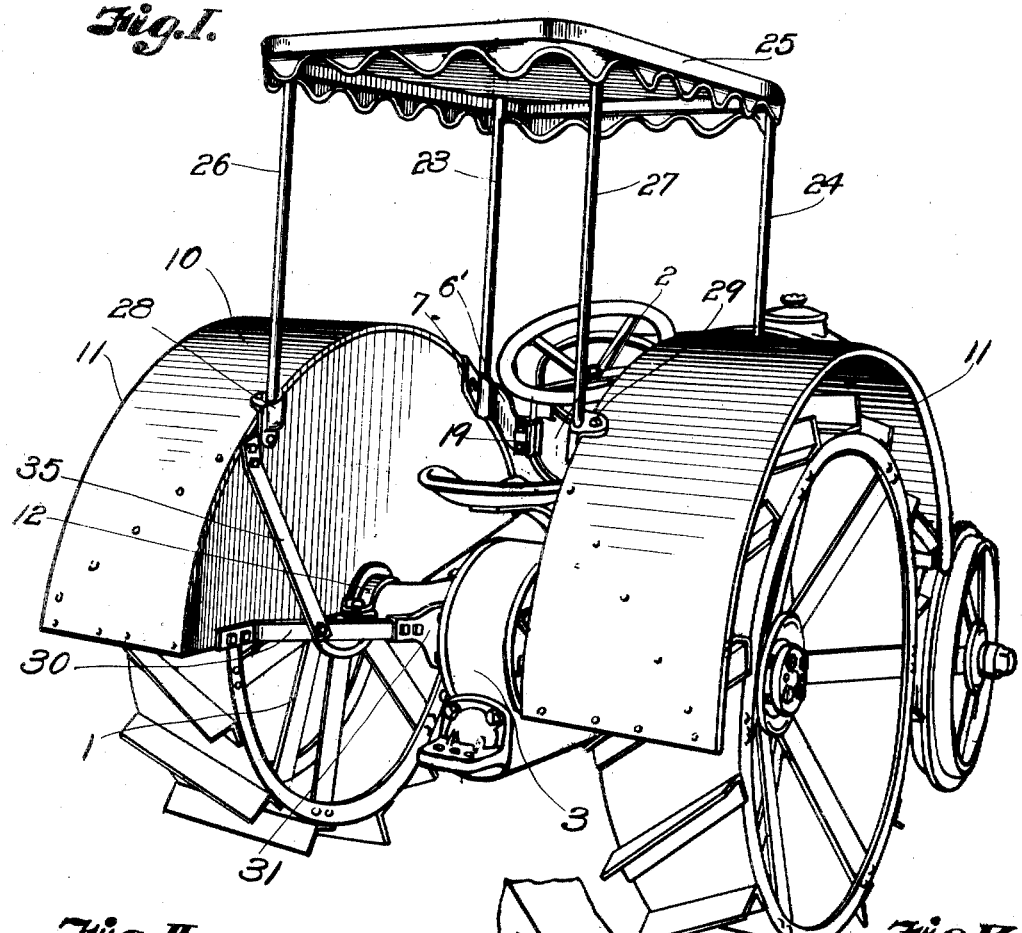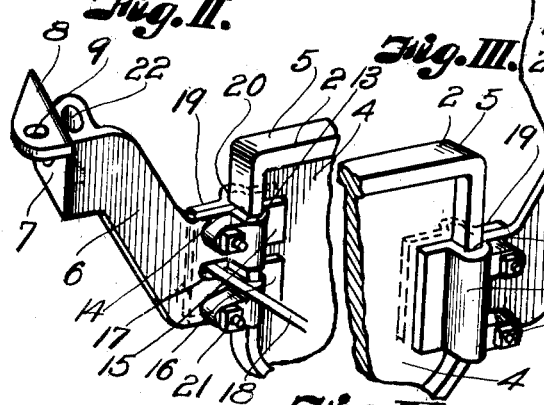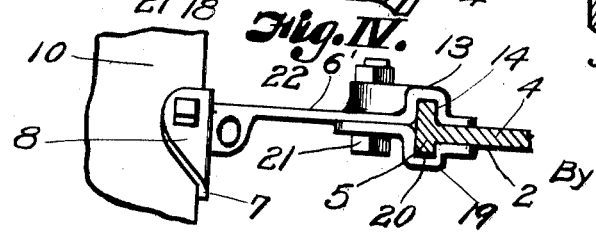

CHARLES W. MOTTS AND HARVEY H. LEWIS, OF ATCHISON, KANSAS, ASSIGNORS TO HENRY WEIS MANUFACTURING COMPANY, OF ATCHISON, KANSAS, A CORPORATION OF KANSAS.

FENDER-ATTACHING MEANS.

1,334,312.   Specification of Letters Patent.   Patented Mar. 23, 1920.

Application filed June 2, 1919.  Serial No. 301,142.

*To all whom it may concern:*

Be it known that we, CHARLES W. MOTTS and HARVEY H. LEWIS, citizens of the United States, residing at Atchison, in the county of Atchison and State of Kansas, have invented certain new and useful Improvements in Fender-Attaching Means; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to fender-attaching clamps for motor driven vehicles such as tractors and the like.

One of the objects of the invention is to provide means for attaching fenders to tractors without the necessity of boring holes in any part of the tractor. It is also the purpose of the invention to provide means for supporting the rear ends of the fenders without removing the bolts of the differential housing or otherwise disarranging the mechanism of the machine.

We have shown the device as applied to what is known to the trade as a 1918 Fordson tractor built by the Ford Manufacturing Company of Dearborn, Michigan, as the device is particularly applicable for this type of machine on account of the fact that the machine is now being sold without fenders and, on account of the particular construction of the Fordson tractor wheels, fenders become necessary to prevent the shoes on the wheel from throwing mud or any other substance against the occupant of the tractor.

The invention also contemplates a provision of means for conveniently and expeditiously attaching to and removing a fender from the tractor or the like as well as to provide means for supporting a canopy or top in a convenient manner.

In the drawings,

Figure I is a perspective view of a tractor equipped with our invention.

Fig. II is a fragmentary perspective view of a dash plate showing one form of bracket attached.

Fig. III is a similar view of a modified form of bracket.

Fig. IV is a top plan view of a bracket attached to a fragment of a dash plate and to a fragment of a fender, and Fig. V is a view of a bracket for securing a brace to the differential housing and to the fender.

Referring now to the drawings by numerals of reference:

1 designates a tractor provided with a front or dash plate 2 and a differential housing 3, the dash plate 2 is shown as constructed with a web 4 and a peripherial flange 5 to which the bracket may be secured. The form of bracket shown in Fig. II consists of a plate 6 provided with a lateral right angular extension 7 with a substantially horizontal fender-engaging lip 8 having an opening 9 to receive a bolt whereby the bracket may be secured to the top 10 of the fender 11. The fender 11 is adapted to rest upon the axle housing and be secured thereto by a collar 12. The inner end of the bracket 6 is provided with a jaw 13 having a groove 14 to receive one edge of the flange 5, the jaw having web-engaging fingers 15 and 16 spaced apart to provide a slot or opening 17 through which a controlling rod 18 may pass to control mechanism used in connection with the engine.

There is a complementary jaw or plate 19 on the opposite side of the web, the complementary jaw having a groove 20 to receive the opposite edge of the flange 5, the two opposite edges clamped together by fastening jaws being clamped together by fastening devices 21. Therefore, when the bracket is secured in place, it will rigidly attach the front end of the fender to the dash iron without marring the iron. The bracket shown in Fig. III is substantially the same as that shown in Fig. II except that no slot 17 is provided, this being unnecessary since the bracket 6 is generally used on the right hand side of the machine and the bracket 6′, shown in Fig. III, is on the left hand side of the machine where no rods are used. In all other respects, the two brackets are alike and each is provided with a vertically disposed standard socket 22 to receive the respective standards 23 and 24 of the canopy or top 25, the rear standards 26 and 27 of the canopy being secured in socket brackets 28 and 29 carried by the rear portions of the fenders 11. The rear portions of the fenders 11 are secured to the differential housing by brace rods 30, one end of which is connected to a fender 11 and the other end to a bracket 31 by fastening devices 32 and 33, the bracket being fastened to the bolts 34 on the housing. The brace rods 30 also carry additional brace rods 35 which are fastened to them and to the fender, as best seen in Fig. I.

When it is desired to remove the fenders, the nuts 21 can be unscrewed from their bolts so that the jaws embracing the flange 5 can be disengaged from the dash iron and the nuts 32 and 33 may be unscrewed from their bolts so that the rod 30 may be detached from the brackets 31, thus permitting the entire fender and canopy to be removed without taking off the nuts or bolts of the differential gearing and without marring the machine.

From the foregoing description it will be apparent that the fenders may be conveniently and expeditiously attached to a type of machine in which no fenders have been provided and this can be accomplished without, in any way, marring or altering the construction of the machine as it was sent from the factory and that the fenders and canopy can be conveniently removed when the occasion demands.

What we claim and desire to secure by Letters-Patent is:

1. In combination with a fender, a bracket secured to the front end of the fender and provided with clamping jaws having oppositely disposed grooves to engage a peripheral flange on a dash iron of a tractor, a brace and supporting rod connected to the other end of the fender, and a removable bracket fastened to the free end of the brace and supporting rod, said bracket having a portion provided with openings spaced apart to correspond to the distances the bolts of the differential housing are spaced whereby the bracket may be secured to the differential housing by the bolts which connect the housing members together.

2. In combination, a fender having a collar for securing it to the axle housing of a tractor, a bracket carried by the front end of the fender and having jaws for engagement with the dash iron of the tractor, a brace and supporting rod connected to the rear end of the fender, and a bracket removably secured to the other end of the brace and supporting rod, said bracket having openings spaced apart to correspond to the spaced relation of the fastening devices which connect the differential housing members of the tractor together.

3. A bracket for supporting the front end of a fender to a motor driven vehicle, said bracket comprising a body portion provided with a vertical intermediate portion, a horizontal fender-engaging lip or flange at one end of the vertical portion, a canopy stake-receiving socket carried by the vertical portion, and clamping jaws at the other end of the bracket.

4. A fender supporting bracket comprising a body portion having at its lower end dash iron-engaging jaws, a laterally projecting fender-engaging lip at the other end of the body portion, and a canopy-stake-receiving member carried by the body portion adjacent to the lip.

5. A bracket for supporting fenders comprising a body portion having clamping jaws at one end and a fender-engaging portion at the other end, and a canopy stake-receiving socket adjacent thereto.

In testimony whereof we affix our signatures.

CHARLES W. MOTTS.
HARVEY H. LEWIS.